(12) United States Patent
Collins et al.

(10) Patent No.: US 6,676,786 B1
(45) Date of Patent: Jan. 13, 2004

(54) METHOD OF AND APPARATUS FOR EVACUATING A GLASS CHAMBER

(75) Inventors: Richard Edward Collins, Sydney (AU); Manfred Lenzen, Sydney (AU); Nelson Ng, Sydney (AU)

(73) Assignee: The University of Sydney (AU)

( * ) Notice: Subject to any disclaimer, the term of this patent is extended or adjusted under 35 U.S.C. 154(b) by 0 days.

(21) Appl. No.: 09/831,590

(22) PCT Filed: Nov. 4, 1999

(86) PCT No.: PCT/AU99/00964

§ 371 (c)(1),
(2), (4) Date: Sep. 6, 2001

(87) PCT Pub. No.: WO00/29703

PCT Pub. Date: May 25, 2000

(30) Foreign Application Priority Data

Nov. 13, 1998 (AU) .............................................. PP7121

(51) Int. Cl.[7] ............................................. C03C 27/06
(52) U.S. Cl. ............................... 156/104.382; 156/109; 156/286; 156/292; 428/34; 52/786.1; 52/786.13
(58) Field of Search ................................. 156/104, 107, 156/109, 285–286, 292, 382; 428/34; 52/786.1, 786.13; 445/53, 56, 57, 73

(56) References Cited

U.S. PATENT DOCUMENTS 5,643,644 A * 7/1997 Demars ........................ 428/34

FOREIGN PATENT DOCUMENTS

| EP | 691200 A | * | 1/1996 | ........... B32B/17/10 |
| WO | WO 98/04802 | * | 2/1998 | ........... E06B/3/663 |

* cited by examiner

Primary Examiner—Michael W. Ball
Assistant Examiner—Jessica Rossi
(74) Attorney, Agent, or Firm—Fitch, Even, Tabin & Flannery

(57) ABSTRACT

A method of and apparatus for evacuating a chamber, for example in vacuum glazing, that is enclosed in part by a glass wall that includes an evacuation port. An evacuating head is employed and is arranged to cover the port and a portion of the glass wall that surrounds the port. The evacuating head has a first cavity that communicates with the port and at least one further cavity that surrounds the first cavity. The first and further cavities are connected by conduits to respective vacuum pumps, which apply differential negative pressure to the first and further cavities, and the chamber is evacuated by way of the first cavity. Evacuation of the chamber may be effected whilst the glazing is subjected to high temperature out-gassing.

13 Claims, 7 Drawing Sheets

(A) Pumping a sample without gasket (B) Pumping a sample with Al gasket

METHOD OF AND APPARATUS FOR EVACUATING A GLASS CHAMBER

FIELD OF THE INVENTION

This invention relates to a method of and an apparatus for use in evacuating a chamber that is defined (ie, enclosed) by a glass wall that includes a port through which evacuation is effected. The invention has been developed in the context of evacuated door and/or window glazing ("vacuum glazing") and the invention is herein after described in that context. However, it will be understood that the invention does have broader application, for example in evacuating cathode ray tubes, including television picture tubes, vacuum flasks, solar collector panels and panel-form display devices.

BACKGROUND OF THE INVENTION

In one form of vacuum glazing, two plane spaced-apart sheets of glass are positioned in face-to-face confronting relationship and are hermetically sealed around their edges with a low melting point glass that commonly is referred to a solder glass. The space (ie, chamber) between the sheets is evacuated and the face-to-face separation of the sheets is maintained by a network of small support pillars. In typical situations the glazing may comprise glass sheets that have a surface area in the order of 0.02 to 4.00 square metres, sheet thicknesses in the order of 2.0 to 5.0 millimetres and a face-to-face spacing in the order of 0.10 to 0.20 millimeters.

The evacuation of glazing presents special problems (relative to the evacuation of many other glass objects), in that the region at which evacuation is effected should not be obtrusive in the final product and in that the evacuating procedure must be appropriate to panels having large surface areas or linear dimensions. The evacuating procedure involves heating the glazing to a high temperature in a so-called bake-out oven (whilst the chamber to be evacuated is connected to an evacuating system) in order to remove gases from surface regions of the sheets and the pillars.

In one method of implementing the evacuating procedure, a small pump-out tube is connected (ie, sealed) to the external surface of one of the glass sheets in communication with an aperture that extends through the lass sheet. The connection between the tube and the glass sheet is made using solder glass, normally at the same time that the solder glass edge-seal is made between the sheets. The solder glass sealing is normally effected at a temperature around 450° C., that is at a temperature that is high enough to melt the solder glass and make a leak-free joint but below a temperature at which significant deformation might occur in the glass sheets.

Following completion of the solder glass sealing, the structure is normally cooled to room temperature. Thereafter, a metal evacuating head is positioned over the pump-out tube and is connected to a remote vacuum pump. The evacuating head includes a central cavity that is dimensioned to receive the pump-out tube and to which the vacuum pump is connected. Also, an O-ring containing groove surrounds the central cavity in the evacuating head and the O-ring is arranged to seal against the tube-surrounding portion of the glass sheet during the evacuating process.

The glazing structure and the evacuating head are loaded into the bake-out oven where evacuation is effected whilst the complete structure is subjected to an out-gassing temperature. Thereafter, the outer end of the pump-out tube is closed by heating the tube to its melting temperature.

A problem that is inherent in the above described evacuating procedure flows from the use of the O-ring to effect sealing between the evacuating head and the glass sheet. All elements of the structure must be heated to substantially the same temperature within the bake-out oven and, because virtually all elastomeric (ie polymeric) O-ring materials decompose at temperatures above about 200° C., the temperature at which out-gassing may be performed is severely limited. As a consequence, in order to achieve adequate out-gassing at the lower temperatures, the procedure must be sustained for long time periods. This limits manufacturing rates and increases manufacturing costs.

A further problem of the above described procedure resides in the fact that two heating steps are required; one at a higher temperature (in the order of 450° C.) to form the solder glass seals and the other at a lower temperature (in the order of 200° C.) when evacuation of the chamber is effected. This two-stage process causes further increases in manufacturing time, due to the need to limit the rate at which temperature changes occur in order to avoid the induction of excessive mechanical stresses in the glazing. Furthermore, the two-stage procedure requires a greater energy consumption than would be necessary if a single-stage procedure might be adopted.

SUMMARY OF THE INVENTION

The present invention is directed to a method of and an apparatus for evacuating a chamber which avoid the need for the use of an elastomeric material to effect a seal between the evacuating head and the glass surface.

Broadly defined, the invention provides a method of evacuating a chamber that is enclosed at least in part by a glass wall that includes an evacuation port. The method comprises the steps of:

(a) covering the port and a portion of the glass wall that surrounds the port with an evacuating head having (i) a first cavity that communicates with the port and (ii) at least one further cavity that surrounds the first cavity and which is closed by the portion of the glass wall that surrounds the port, (b) evacuating the closed further cavity or, if more than one, each of the further cavities in the evacuating head, and (c) evacuating the chamber by way of the first cavity in the evacuating head.

The invention is further defined as providing an apparatus for use in evacuating a chamber that is enclosed at least in part by a glass wall that includes an evacuation port. The apparatus comprises:

(a) an evacuating head that is arranged to cover the port and a portion of the glass wall that surrounds the port, the evacuating head having a first cavity that is arranged in use to communicate with the port and at least one further cavity that surrounds the first cavity, (b) a first conduit communicating with the first cavity and arranged for connecting a vacuum pump to the first cavity, and (c) a further conduit connecting with the further cavity or, if more than one, with each of the further cavities and arranged for connecting a vacuum pump to the or each further cavity.

PREFERRED FEATURES OF THE INVENTION

In the various aspects of the invention, separate vacuum pumping systems preferably are provided for connection to the first and further cavities respectively of the evacuating head. However, evacuation of the or each further cavity may be effected at a significantly lower level (ie, to produce a less complete vacuum) than that which is applied to the first cavity.

As indicated previously, the invention has application to the fabrication of evacuated glazing and, in this application, the chamber to be evacuated will comprise a space that is defined by two edge-sealed glass sheets. One of the sheets will be provided with a pump-out tube to form the port through which evacuation is effected, and the first cavity of the evacuating head will be shaped and dimensioned to receive the pump-out tube.

With this preferred aspect of the invention in mind, the invention may be further defined in terms of a method of forming evacuated glazing wherein the evacuating process is effected whilst simultaneously effecting heat induced out-gassing of the chamber. The out-gassing procedure most preferably is commenced at a temperature that is slightly less than (typically 50° C. to 100° C. less than) that at which edge sealing of the glass sheets is completed.

The invention will be more fully understood from the following description of preferred embodiments of an apparatus for and a method of implementing the invention. The description is provided with reference to the accompanying drawings.

DETAILED DESCRIPTION OF THE INVENTION

Figure 1:
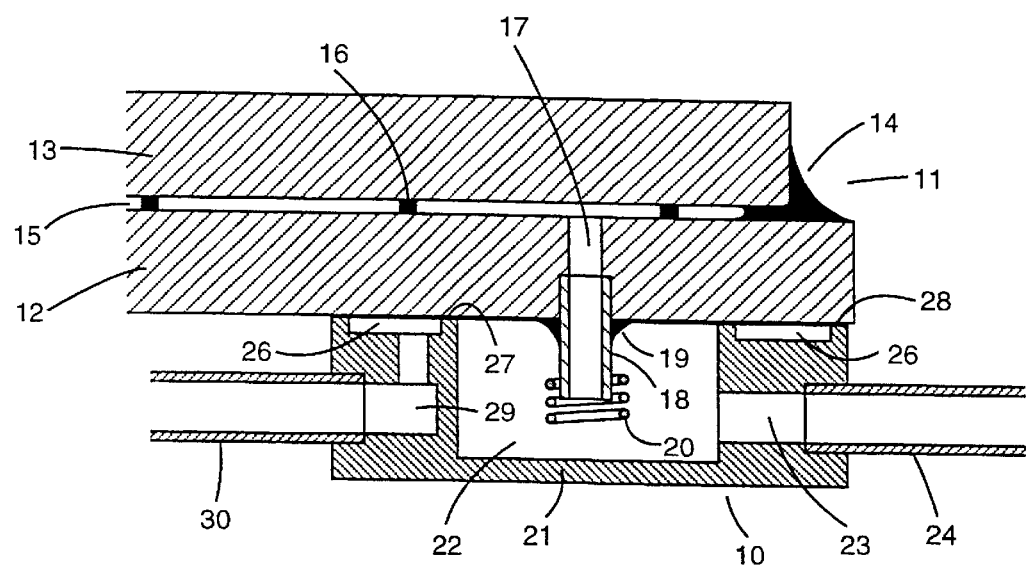
FIG. 1 shows a sectional elevation view of an evacuating head mounted to a portion of glazing that is to be evacuated.

As illustrated in FIG. 1, an all-metal evacuating head 10 is shown mounted to glazing 11 that is to be evacuated. The glazing comprises two plane glass sheets 12 and 13 that are maintained in spaced-apart face-to-face confronting relationship. The glass sheets would normally be composed of soda-lime glass and be interconnected along their edges by a bead 14 of edge-sealing solder glass.

A chamber 15 is defined by the two glass sheets 12 and 13 and the sheets are maintained in spaced relationship by a network or array of support pillars 16. The chamber 15 is evacuated to a level below 10−3 Torr, this providing for gaseous heat conduction between the sheets that is negligible relative to other heat flow mechanisms.

The glass sheet 12 is formed with an aperture 17, and a glass pump-out tube 18 is positioned to locate within and project outwardly from the aperture 17. The pump-out tube is sealed to the glass sheet by a bead 19 of solder glass.

A metal filament 20 is shown to surround the pump-out tube 18 and this may be employed, following evacuation of the cavity 15, to melt and close the pump-out tube, although other techniques may be employed for this purpose.

The evacuating head 10 comprises a metal body 21 which incorporates or is formed with a central, first cavity 22. The first cavity 22 is shaped and dimensioned to receive the pump-out tube 18 and to provide for unrestricted movement of gas during evacuation and out-gassing of the chamber 15.

Figure 2:
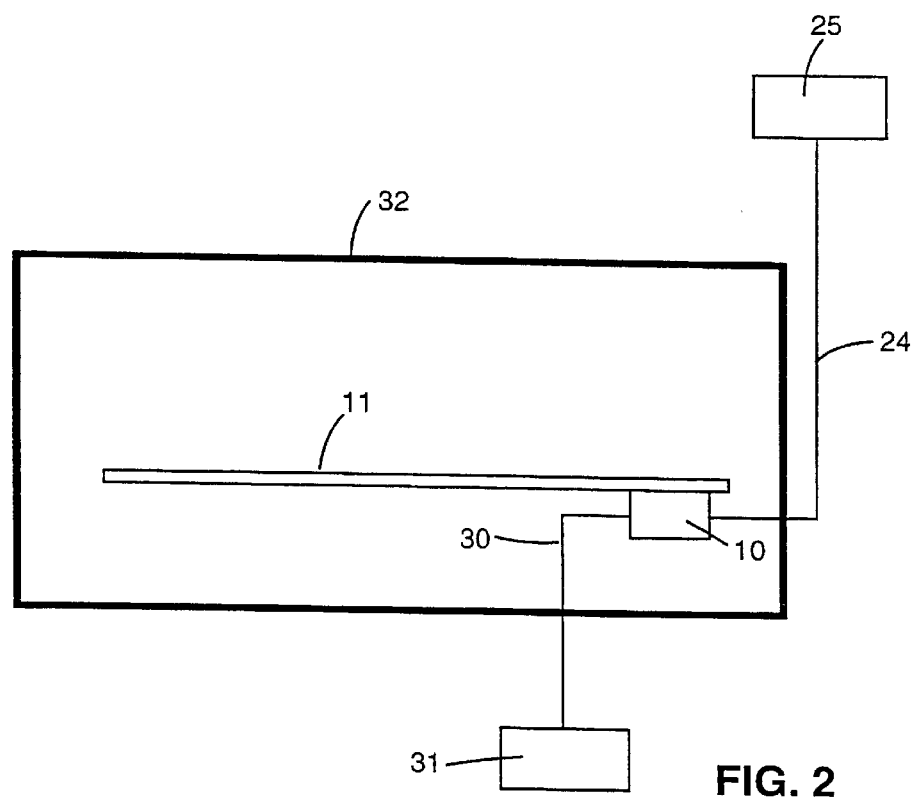
FIG. 2 shows a schematic representation of glazing located within a bake-out chamber and connected to external vacuum pumps by way of the evacuating head.

The first cavity 22 is connected by way of a port 23 and a conduit 24 to vacuum pump 25 that is located outside of a baking chamber 32, as shown schematically in FIG. 2.

A second, annular cavity 26 also is provided within the body 21 of the evacuating head. The second cavity 26 is positioned to surround the first cavity 22 and is arranged in use to be closed by the surface of the glass sheet 12 that surrounds the pump-out tube 18. A first annular land 27 is located between the first and second cavities 22 and 26, and a second annular land 28 surrounds the annular second cavity 26. The two lands 27 and 28 make contact with the surface of the glass sheet 12 over a small area and so limit gas flow into the second cavity 26 and between the two cavities 22–26.

The second cavity 26 is connected by way of a port 29 and a conduit 30 to a further vacuum pump 31, as indicated in FIG. 2.

The evacuating head 10 will typically have an outside diameter of 50 mm to 100 mm and the first, central cavity 22 will typically have a diameter in the order of 10 mm to 20 mm. The lands 27 and 28 will each have a radial width in the order of 1 mm but may be in the range 0.10 mm to 10 mm.

Figure 3:
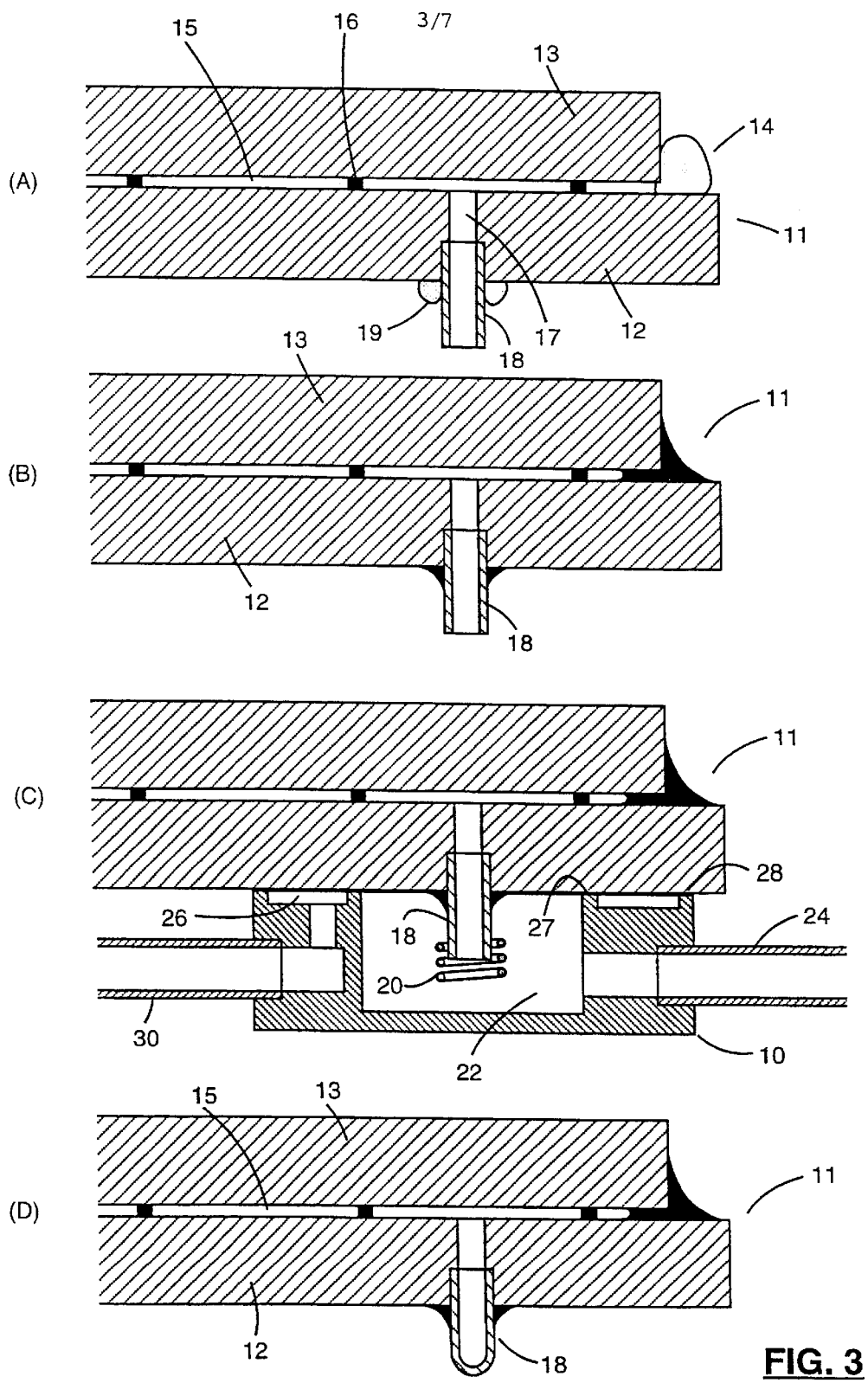
FIG. 3 shows sequential steps A to D in the fabrication of glazing using the evacuating procedures of the invention as applied to a particular glazing arrangement.

FIG. 3 shows the sequential steps of fabricating an evacuated glazing unit.

The sheets 12 and 13 are first assembled in spaced-apart relationship (as above described) and a bead 14 of unfused solder glass is deposited around the edge of sheet 13. Similarly, a bead 19 of unfused solder glass is deposited around the pump-out tube 18 that is located within aperture 17 in sheet 12.

The further fabrication steps may then be performed by way of a single heating procedure. After assembling the two glass sheets and depositing the beads of solder glass, the evacuating head 10 is mounted to the surface of the sheet 12 so as to surround the pump-out tube 18, and the annular cavity 26 between the two annular lands 27 and 28 is evacuated by the pump 31. The chamber 15 between the two glass sheets is not evacuated during this initial step.

The complete assembly, including the evacuating head 10, is heated to around 450° C. within the oven 32 and, during this process, the solder glass melts to form seals around the edges of the glazing and around the pump out tube. The glazing and evacuating head are then cooled to a temperature (around 380° C.) at which the solder glass solidifies, and evacuation of the chamber 15 between the two glass sheets 12 and 13 is then commenced by connecting the high vacuum system 25 to the central cavity 22 of the evacuating head. Evacuation of the cavity is maintained as the glazing and evacuating head are cooled. The specific temperataure/time schedule that is used during this cooling period will depend upon the time necessary to achieve adequate out-gassing of the internal surfaces of the glazing.

When out-gassing and evacuation have been completed, the pump-out tube 18 is melted and fused closed, using the filament element 20.

The vacuum pump 31 may comprise a mechanical vacuum pump, commonly referred to as a backing pump, which may achieve an ultimate vacuum in the order of $10^{-3}$ Torr. However, with the arrangement as shown there will be some leaking of gas past the outer land 28, and the level of vacuum that will be achieved in the second cavity 26 between the two lands 27 and 28 will be dependent upon the magnitude of the leakage and on the pumping speed of the conduit 30 that connects the evacuating head to the pump 31.

It has been established that it is relatively simple to achieve a level of vacuum that is much less than 1 Torr within the second cavity 26 and, whilst such a vacuum level is not sufficiently low for evacuation of the glazing chamber 15, the sealing vacuum is sufficient to facilitate the achievement of the required vacuum within the glazing chamber when the first cavity is evacuated by way of the vacuum pump 25.

The vacuum pumping system 25 that is employed to create the high vacuum level may incorporate a diffusion pump or a turbomolecular pump. Such vacuum systems may readily achieve a base pressure of $10^{-5}$ Torr or less.

Some leakage of gas will occur from the second cavity 26 to the first, central cavity 22 but, as a consequence of the construction of the evacuating head, the magnitude of this leakage will be sufficiently low as to make a very small or negligible contribution to the pressure within the first cavity of the evacuating tool.

In order that the above described evacuating procedure may be effective, the confronting surfaces of the glass sheet and the evacuating head must be flat to close tolerances and be free of significant scratches. However, it has been determined that departures from planarity of soda-lime glass that is made by the float process are extremely small and, over typical outside dimensions of the evacuating tool of approximately 50–100 mm, the departure from planarity is usually less than a few microns. Similarly, the evacuating head may be manufactured to provide sealing surfaces of the lands 27 and 28, as machined in a good quality lathe, with a flatness of the same order as that found in manufactured glass sheets.

As a consequence, when the annular, second cavity 26 of the evacuating head is evacuated, the evacuating head is forced against the glass sheet by atmospheric pressure. The surfaces will be brought into sufficiently close contact that leakage past the sealing lands 27 and 28 will be tolerably small.

Figure 4:
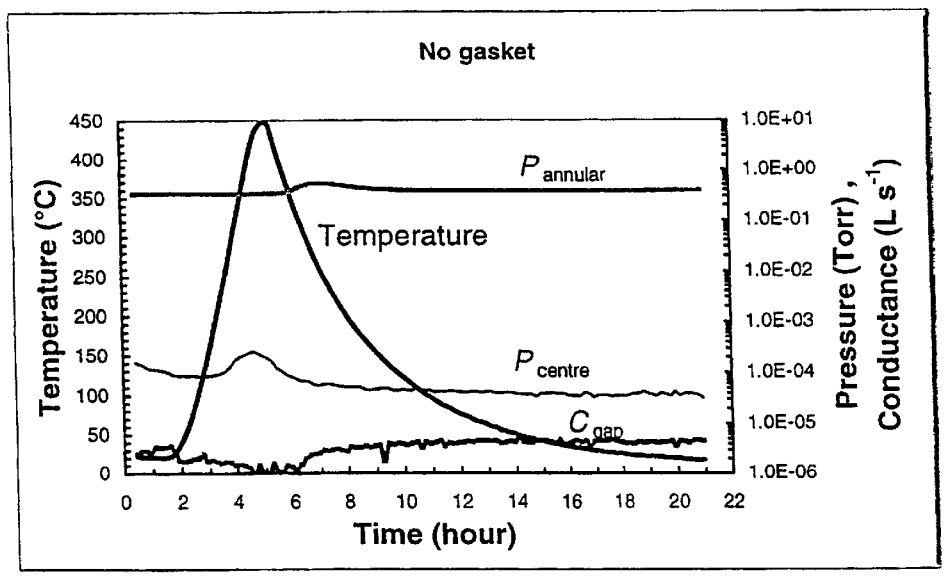
FIG. 4 shows plots of measurements obtained in implementation of the evacuating procedure of the invention.

FIG. 4 shows results of experimental measurements of pressures within the second, annular cavity 26 ($P_{annular}$) and the first, central cavity 22 ($P_{centre}$), and the conductance of gas across the inner land 27 ($C_{gap}$) with the evacuating head 10 mounted to a 3 mm thick sheet of soda lime glass. The results were obtained during a processing cycle in which the temperature of the glass sheet and the evacuating head 10 was increased to 450° C., and subsequently reduced. The evacuating head 10 used in the measurements has sealing lands 27 and 28 of 16 mm and 80 mm outside diameter respectively. Each sealing land 27 and 28 is 1 mm wide.

In obtaining the measurements, the annular space 26 was evacuated through a 1 m long conduit 30 having a 10 mm inside diameter connected to the evacuating head 10.

A large number of experiments have been performed with different evacuating heads 10 having sealing lands of width in the range of 1 to 10 mm and different outer diameters of the evacuating head in the range 50 to 100 mm, and $P_{annular}$ was measured for the various evacuating heads.

The rate of leakage of gas (commonly referred as "throughput") through the outer sealing land 28 of the evacuating head 10 may be determined from the relevant formula provided in standard references on vacuum technology. For the gas throughput in the vacuum system connected to the annular space 22:

$$\text{Throughput} = S_{pipe}(P_{annular} - P_{pumping\ end}). \quad (1)$$

In this expression, $S_{pipe}$ is the pumping speed through the pipe 34 measured in $L.s^{-1}$, and $P_{pumping\ end}$ is the pressure at the pumping end of the vacuum system connected to the annular cavity 26. For a typical rotary pump, $P_{pumping\ end}$ can be assumed to be negligible and, therefore, to good accuracy, equation (1) can be reduced to:

$$\text{Throughput} = S_{pipe} P_{annular}. \quad (2)$$

At the pressures (in the second annular cavity 26) that have been achieved experimentally, the mean free path for molecule-molecule collisions is much less than the diameter of the pipe 34. Under these conditions, $S_{pipe}$ is given by the relevant formula provided in standard references on vacuum technology:

$$S_{pipe} = 90(d^4/l)P_{annular}. \quad (3)$$

where d and l are in cm and $P_{annular}$ is in Torr.

Formula (3) has been derived for a gas of molecular weight of 30, which is close to that of nitrogen (28) and oxygen (32), the principal constituents of air. For other gases, the pumping speed will be slightly different, but not significantly so.

Using equations (2) and (3), the throughput as a function of $P_{annular}$ is given by:

$$\text{Throughput} = 90(d^4/l) P_{annular}^2. \quad (4)$$

This formula is applicable only when the mean-free path for molecule-molecule collisions in the vacuum system is much less than the diameter of the pipe 30, and when $P_{pumping\ end}$ can be neglected. From equation (4), the throughput was routinely found to be below 0.01 Torr $L.s^{-1}$ provided adequate care was taken to remove dust or particulates from contacting surfaces.

If the figure of 0.01 $L.s^{-1}$ is therefore taken as an upper limit of the likely leakage rate past the outer sealing land 28, it is possible to select appropriate dimensions for the evacuation conduit 30 to be connected to the annular cavity 26 by using equation (4) for a specified desired pressure $P_{annular}$ in the annular cavity 26. In general, it is found that adequately low pressures can be obtained over a wide range of dimensions of the evacuation conduit 30.

It may be observed from the results shown in FIG. 4 that both the pressure in the annular cavity 26 and the conductance of the inner sealing surface 27 vary slightly during the heating and cooling of the evacuating head. These variations are due to very small relative movements of the metal and glass surfaces associated with slight softening of the glass at high temperatures, and differences in their coefficients of thermal expansion.

In some applications of the invention, it may be preferable to use a two-step heating process, for example when it is desired to include within the glazing a thermally-activated reactive metal getter to scavenge any emitted gas from the internal space over the life of the device. Such metal getters need to be heated to high temperatures in vacuum in order that they will become chemically active, and they degrade irreversibly if heated to 450° C. in air. Therefore, if such a getter were required, it could only be installed into the glazing after the edge sealing process has been completed. Pumping of the glazing would then commence prior to the second heating step and the getter would be protected from degradation during the second heating stage to about 350° C. because it would be in vacuum.

It has been found that the inner land surface 27 may not seal well to the surface of the glass 12 when the evacuating head is used in a two-step heating process. The reason for this is that the temperatures necessary to melt the solder glass and to form the edge seal are so high that slight deformation in the glass sheets may occur. The resulting departures from planarity of the surface of the glass sheets around the pump out tube may lead to a significant gap between the inner metal sealing land 27 and the glass.

This problem may be overcome by using an aluminum foil gasket, between 10 $\mu$m and 50 $\mu$m thick and by placing the gasket between the inner sealing land 27 and the glass surface. The aluminum gasket will distort under the force due to atmospheric pressure, resulting in the creation of a seal between the inner sealing land 27 and the glass surface.

Figure 5:
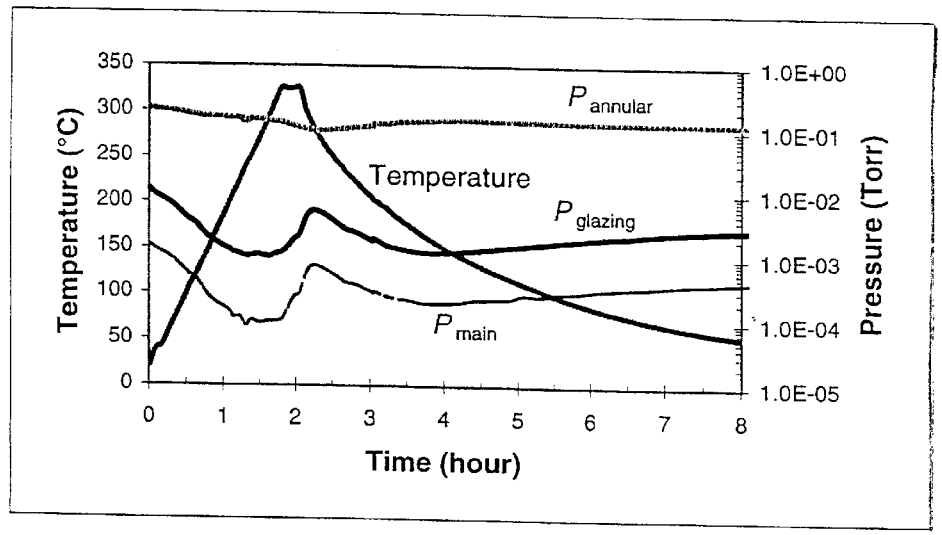
FIG. 5 shows plots of measurements obtained from implementation of a modified form of the invention.
Figure 5:
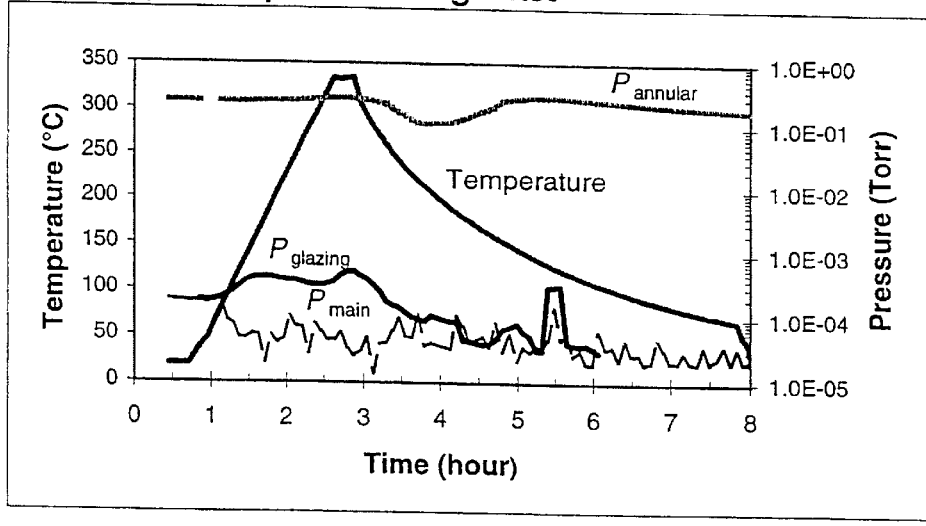

FIG. 5 shows experimental data that has been obtained from a sample of vacuum glazing that has been manufactured in a two-step process using the evacuating head 10. Identified in FIG. 5 are the pressure in the annular, second cavity 26 ($P_{annular}$), the pressure in the central, first cavity 22 ($P_{centre}$) and the pressure in the glazing ($P_{glazing}$) during an evacuating cycle in which the temperature of the glazing was increased to above 300° C., and then decreased. FIG. 5A shows data without use of an aluminum gasket. FIG. 5B shows data for the same sample with an 18 $\mu$m thick aluminum gasket present, and it can been seen that a significant improvement in the pressure in the central cavity 22 occurs due to a reduction in the leakage past the inner land 27.

Figure 6:
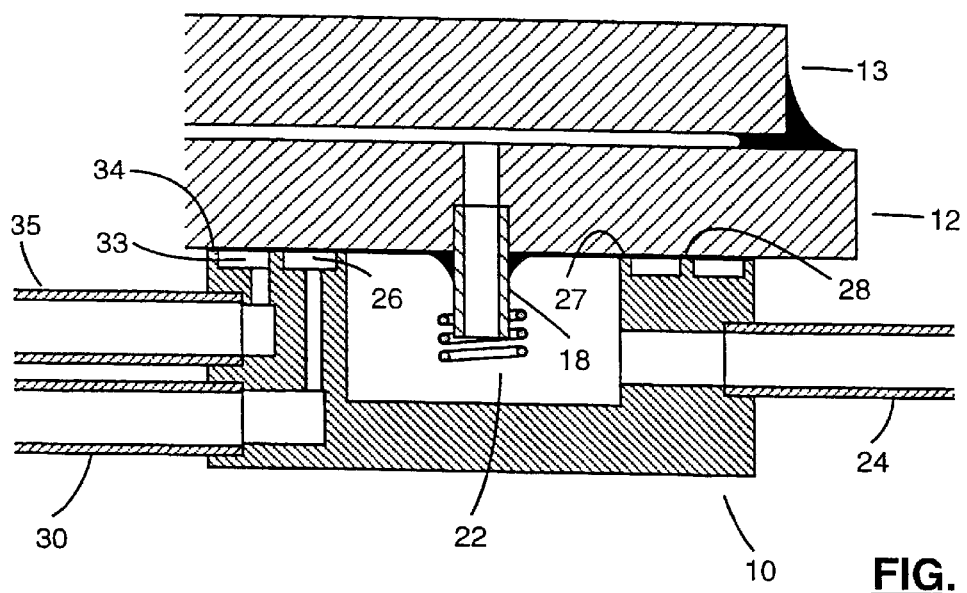
FIG. 6 shows a sectional elevation view of a modified form of evacuating head mounted to a portion of glazing that is to be evacuated.

In an alternative embodiment of the evacuating head, as shown in FIG. 6, the evacuating head 10 is provided with second and third concentrically disposed annular cavities 26 and 33. This arrangement results in the provision of first, second and third sealing lands 27, 28 and 34.

Each of the second and third annular cavities 26 and 33 is separately connected to an evacuating system (not shown) by way of conduits 30 and 35. Separate evacuating systems may be provided for each of the second and third annular cavities 26 and 33, or a common evacuating system may be provided for both of the annular cavities. However, in either case, a separate (substantially lower pressure) vacuum system will be provided for the central, first cavity 22.

With this arrangement, the level of the vacuum in the inner annular cavity 26 will be relatively unaffected by that in the outer, third, annular cavity 33.

Figure 7:
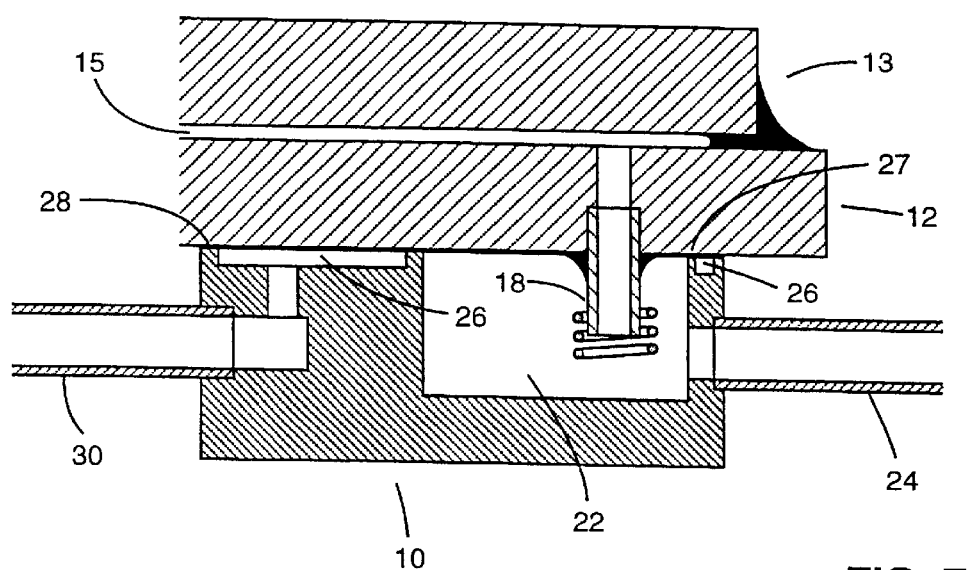
FIG. 7 shows a sectional elevation view of a further modified form of evacuating head mounted to a portion of glazing that is to be evacuated.

FIG. 7 shows a further variation of the evacuating head and one which is suitable for use in situations were the pump-out tube 18 is to be located very close to one edge of the glass sheet 12. The arrangement shown in FIG. 7 is somewhat similar to that shown in FIG. 1, except that the first cavity 22 is eccentrically disposed relative to the surrounding second cavity 26. This requires that the cross sectional area of the second cavity 26 should change around the circumference of the cavity.

Further variations and modifications may be made in respect of the invention as above described.

What is claimed is:

1. A method of evacuating a chamber that is enclosed at least in part by a glass wall that includes an evacuation port, the method comprising the steps of:
   (a) covering the port and a portion of the glass wall that surrounds the port with an evacuating head having (i) a first cavity that communicates with the port and (ii) at least one further cavity that surrounds the first cavity and which is closed by the portion of the glass wall that surrounds the port,
   (b) evacuating the closed further cavity or, if more than one, each of the closed further cavities in the evacuating head, and
   (c) evacuating the chamber by way of the first cavity in the evacuating head.

2. The method as claimed in claim 1 when applied to vacuum glazing, in which the chamber is defined by two spaced-apart, edge-sealed glass sheets and wherein evacuation of the first and further cavities is effected while simultaneously effecting heat-induced outgassing of the chamber.

3. The method as claimed in claim 1 wherein the first and further cavities are evacuated respectively by first and further vacuum pumps.

4. The method as claimed in claim 3 when applied to vacuum glazing, in which the chamber is defined by two spaced-apart, edge-sealed glass sheets and wherein evacuation of the first and further cavities is effected while simultaneously effecting heat-induced outgassing of the chamber.

5. The method as claimed in claim 3 wherein the chamber and the first cavity are evacuated to a lower pressure level than the closed further cavity or, if more than one, the closed further cavities.

6. The method as claimed in claim 5 when applied to vacuum glazing, in which the chamber is defined by two spaced-apart, edge-sealed glass sheets and wherein evacuation of the first and further cavities is effected while simultaneously effecting heat-induced outgassing of the chamber.

7. The method as claimed in claim 5 wherein the or, if more than one, each closed further cavity is evacuated to a level in the order of $10^0$ to $10^\circ$ Torr and wherein the chamber and the first cavity are evacuated to a level in the order of $10^{-3}$ to $10^{-5}$ Torr.

8. The method as claimed in claim 7 when applied to vacuum glazing, in which the chamber is defined by two spaced-apart, edge-sealed glass sheets and wherein evacuation of the first and further cavities is effected while simultaneously effecting heat-induced outgassing of the chamber.

9. An apparatus for use in evacuating a chamber that is enclosed at least in part by a glass wall that includes an evacuation port, the apparatus comprising:

(a) an evacuating head that is arranged to cover the port and a portion of the glass wall that surrounds the port, the evacuating head having a first cavity that is arranged in use to communicate with the port and at least one further cavity that surrounds the first cavity, (b) a first conduit communicating with the first cavity and arranged for connecting a vacuum pump to the first cavity, and (c) a further conduit connecting with the further cavity or, if more than one, with each of the further cavities and arranged for connecting a vacuum pump to the or each further cavity.

10. The apparatus as claimed in claim 9 wherein the first and further cavities are concentrically disposed.

11. The apparatus as claimed in claim 9 wherein the evacuating head has one only further cavity (i.e. a second cavity) that surrounds the first cavity, and wherein the evacuating head has an inner annular land that is located between the first and second cavities and which is arranged in use to contact the portion of the glass wall that surrounds the port, and (ii) an outer annular land that surrounds the second cavity and which is arranged also in use to contact the portion of the glass wall that surrounds the port.

12. The apparatus as claimed in claim 11 wherein the first and second cavities are eccentrically disposed and wherein the cross-sectional area of the second cavity varies around the circumference of the cavity.

13. The apparatus as claimed in claim 11 wherein the first and further cavities are concentrically disposed.

* * * * *

UNITED STATES PATENT AND TRADEMARK OFFICE
CERTIFICATE OF CORRECTION

PATENT NO. : 6,676,786 B1
DATED : January 13, 2004
INVENTOR(S) : Richard Edward Collins, Manfred Lenzen and Nelson Ng It is certified that error appears in the above-identified patent and that said Letters Patent is hereby corrected as shown below:

Column 3,
Line 63, should be -- level below $10^{-3}$ Torr --;

Column 8,
Line 55, second "10° Torr" should read -- $10^{-3}$ Torr --; and

Column 10,
Line 3, "(i)" should be inserted before -- an inner --.

Signed and Sealed this

Twenty-third Day of November, 2004

JON W. DUDAS
*Director of the United States Patent and Trademark Office*